Nov. 13, 1951   C. RUSCITTI ET AL   2,574,499
SAW SHARPENER
Filed May 19, 1948   4 Sheets-Sheet 1
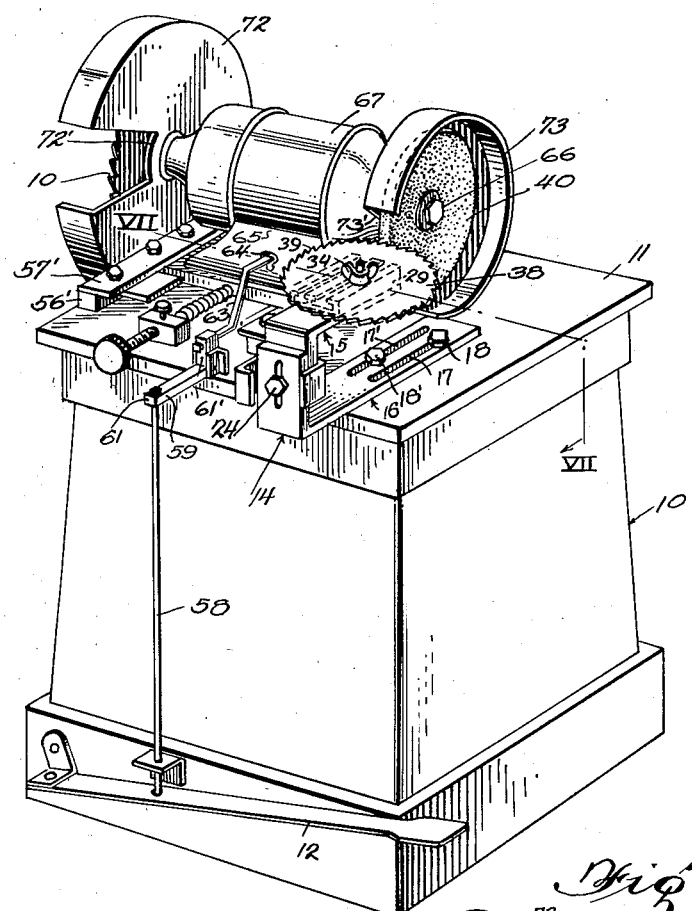
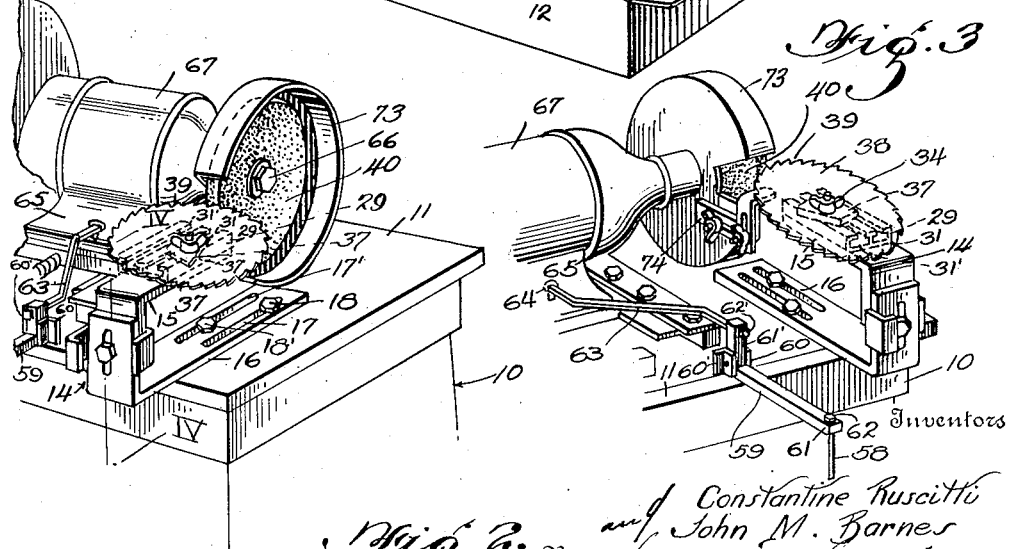
Inventors
Constantine Ruscitti
and John M. Barnes
By George W. Gardes
Joseph H. Crowe
Attorneys

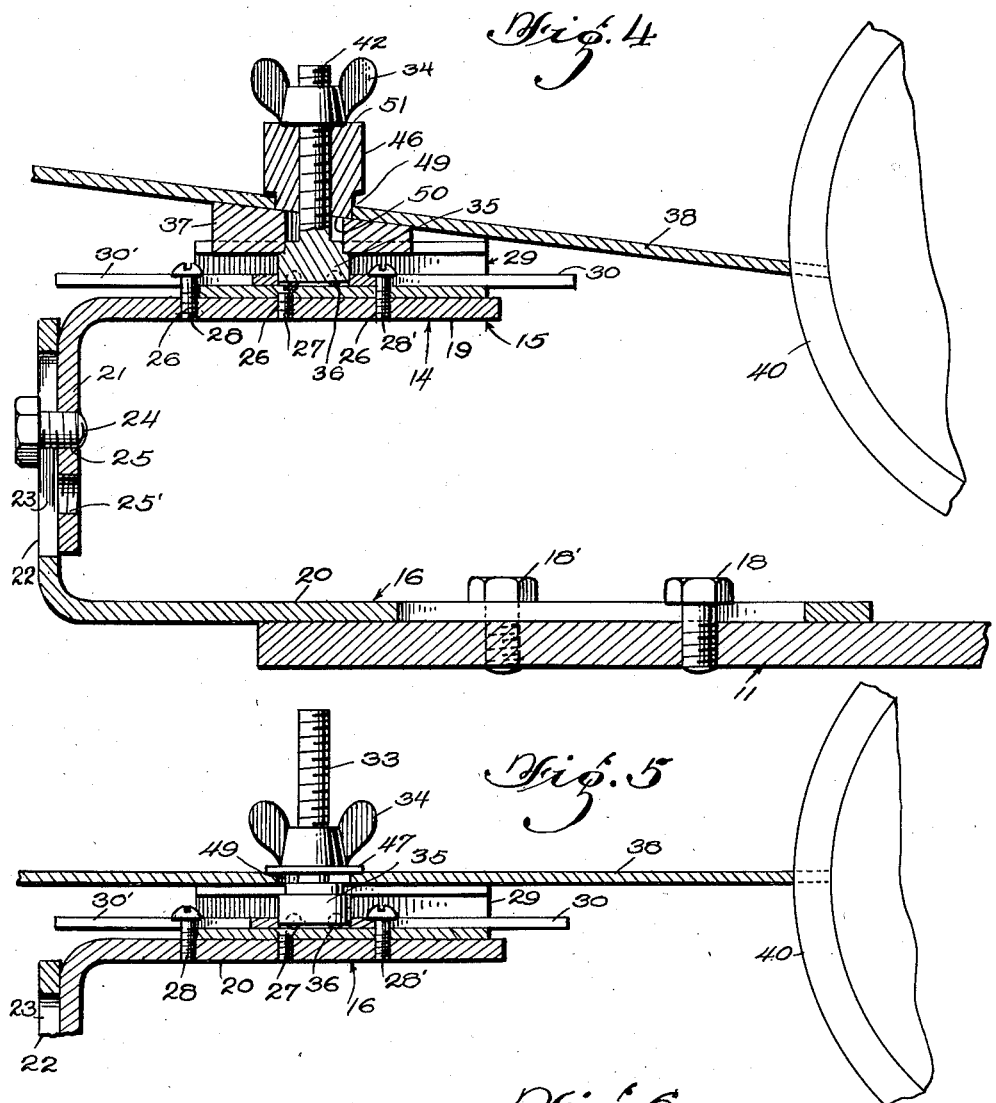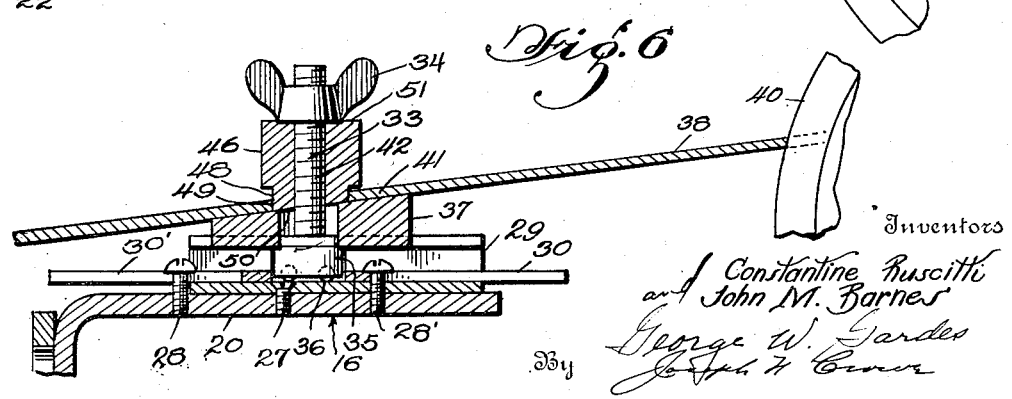

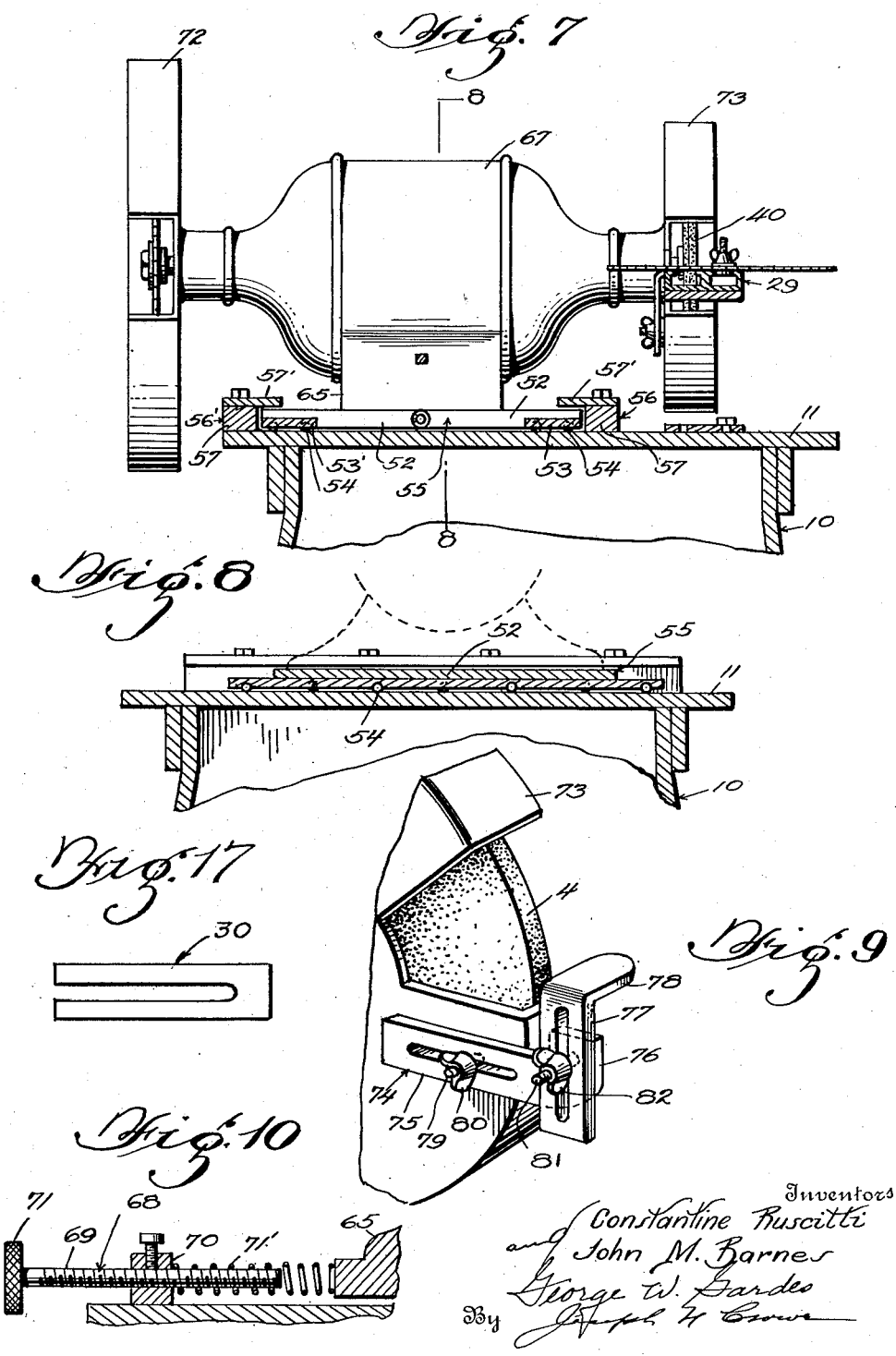

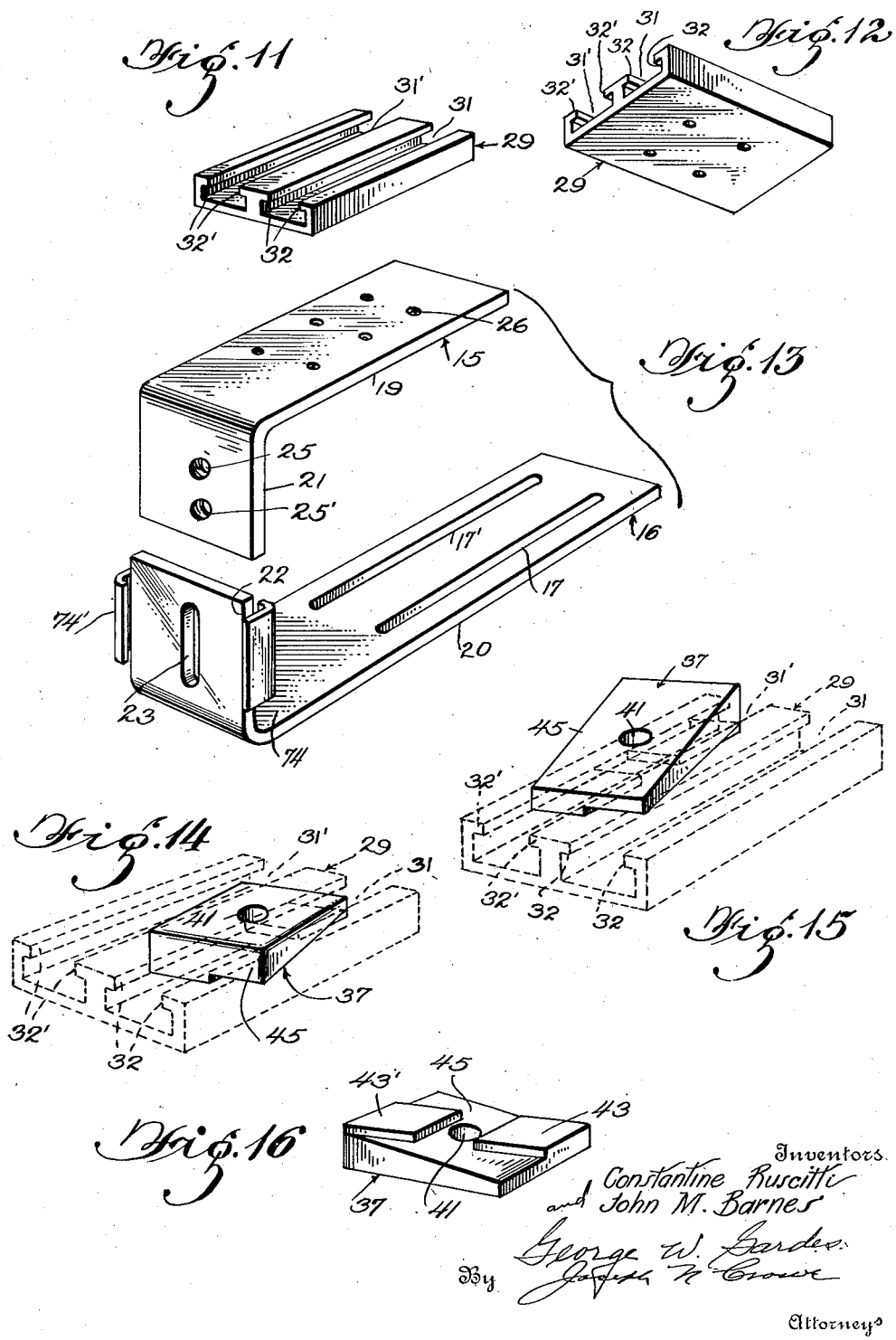

Patented Nov. 13, 1951

2,574,499

UNITED STATES PATENT OFFICE 2,574,499

SAW SHARPENER

Constantine Ruscitti and John M. Barnes, Cincinnati, Ohio

Application May 19, 1948, Serial No. 28,038

4 Claims. (Cl. 76—41)

(Granted under the act of March 3, 1883, as amended April 30, 1928; 370 O. G. 757)

The invention described herein may be manufactured and used by or for the Government for governmental purposes, without payment to us of any royalty thereon.

This invention relates generally to saw sharpening apparatus but more particularly to a saw grinder by which the blade to be sharpened may be properly aligned for cutting straight teeth or for beveling the teeth at a predetermined angle, for controlling the depth of the cut, and for advancing the cutter into and out of cutting engagement with the teeth.

One object of the invention is to provide a saw grinder which may be easily adjusted to sharpen either cross-cut, rip-cut, or combination saw blades.

Another object of the invention is to provide a device for sharpening saws which is entirely free from "chattering" and "kicking" of the grinder against the saw, and one which issues smooth grinding.

Further objects and advantages of the invention will become apparent as the description proceeds, and features of novelty will be pointed out in particularity in the appended claims.

The invention will be understood more readily by reference to the accompanying drawings, in which:

Fig. 1 is a perspective view of the apparatus showing the base, the relative location of the grinding apparatus and blade to be sharpened and operating mechanism on said base;

Fig. 2 is a perspective view of a portion of the apparatus showing the arrangement of the arbor and grinding disk;

Fig. 3 is a perspective view of the portion of the apparatus as shown in Fig. 2, but taken at a different angle to show the opposite side of the arbor;

Fig. 4 is a sectionized elevation showing the arbor and a blade mounted upon a tilting block supported thereby, the blade being tilted downward to engage the cutting disk below the axis thereof and the section being taken on the line 4—4 of Fig. 2;

Fig. 5 is a sectionized elevation similar to Fig. 4 but showing a portion of the arbor and a blade mounted upon the double channel plate, the blade engaging the cutting disk on a level with the axis thereof;

Fig. 6 is a sectionized elevation similar to Fig. 4 but showing the arbor and a blade mounted upon a tilting block supported thereby, the blade being tilted downwardly to engage the cutting disk below the axis thereof;

Fig. 7 is a partially sectionized view showing the grinding motor slidably mounted upon the top plate of the base, the section being taken on the line 7—7 of Fig. 1;

Fig. 8 is a partially sectionized view taken on the line 8—8 of Fig. 7;

Fig. 9 is a perspective view showing a portion of the grinding disk, the guard and the slatted rest plate;

Fig. 10 is a longitudinal section showing the adjustable stop member and a portion of the motor base;

Fig. 11 is a top perspective view of the double channel plate;

Fig. 12 is a bottom perspective view of the double channel plate;

Fig. 13 is a perspective view of the upper and lower arbor plates;

Fig. 14 is a perspective view of the tilting block positioned in one of the channels of the double channel plate;

Fig. 15 is a perspective view of the tilting block positioned in the opposite channel of the double channel and reversed in direction;

Fig. 16 is a perspective view of the tilting block showing the lower raised portions thereof; and Fig. 17 is a plan view of the slotted clamping plate.

Briefly stated, the saw grinder which forms the subject matter of this invention consists of a base on which is slidably mounted a grinding motor, having a grinding disk connected to one end of its armature shaft, and an adjustable blade support adapted to hold a rotary saw blade so that the grinding disk can engage the teeth thereof at the correct angle for cutting suitable bevels thereon. The motor driven cutting disk is brought into and out of engagement by movement of the motor and this is accomplished by the operation of a treadle which is connected through a bell-crank and links to the motor.

The machine is mounted upon a base 10 which may be formed with enclosed sides as illustrated in Fig. 1, or as a frame structure. To the top plate 11 of the base or frame are attached the various elements of the grinding apparatus and to the lower portion of one side of the base is pivotally connected a control treadle 12, the purpose of which will be later described.

To the top plate 11 is adjustably connected the arbor 14. The arbor consists of an upper and a lower plate 15 and 16, respectively. The lower plate is provided with longitudinal slots 17 and 17', through which fit the studs 18 and 18' which allow for longitudinal adjustment of the arbor.

The upper and lower plates 15 and 16, respectively, are bent at right angles to form horizontal portions 19 and 20 and vertical portions 21 and 22. The horizontal portion 20 of the lower plate 16 is attached to the top plate 11 of the base 10 by studs 18 and 18' as described above. The vertical portion 22 of the lower plate 16 is provided with a central longitudinal slot 23 through which a stud 24 projects and which screws into a tapped hole 25 in the vertical portion 21 of the upper plate and thus clamps the vertical portion 21 of the upper arbor plate 15 to the vertical portion 22 of the lower arbor plate 16. An additional tapped hole 25' is provided in the vertical portion 21 of the upper arbor plate 15 to allow for a greater adjustment in the height of the arbor. Retaining guides 74 and 75' (see Fig. 13) are secured to the upright portion 22 of the lower plate 16 of the arbor 14. These guides prevent angular movement of the upper plate 15.

The horizontal portion 19 of the upper arbor plate 15 is provided with parallel rows of tapped holes 26 for the reception of screws 27, 28 and 28'. The screws 27 attach a double channel plate 29 to the upper arbor plate 15 and the screws 28 and 28' retain the slotted clamping plates 30 and 30' in contact with the floor of the double slotted channel plate 29 as shown in Figs. 4 to 6, inclusive.

The double slotted channel plate 29 is an elongated member provided with parallel longitudinal channels 31 and 31'. The channels are rectangular in cross-section and are provided with projecting upper edges 32 and 32' for the retention of a square-head threaded pin 33 which is slidably mounted within one of the channels. This pin is provided with a winged nut 34 as will be further described.

The head 35 of the square-head threaded pin 33 is provided with ball bearings or roller bearings 36 so that it can easily slide within the channels of the double channel plate 29. The slotted clamping plates 30 and 30' are placed on each side of the head 35 of the square-headed pin 33 to clamp the same in a fixed position within a slot of the double channel plate 29. These slotted clamping plates 30 and 30' are rigidly held on the floor of either of the slots of double channel plate by the screws 28 and 28'.

Beveled tilting blocks 37 are provided to retain the disk saw 38 to be sharpened at a suitable angle for beveling the cutting teeth 39 thereof by the rotary grinding disk 40. The beveled tilting block 37 is provided with a central opening 41 which fits over the threaded portion 42 of the square-head threaded pin 33. The tilting block 37 is provided with raised portions 43 and 43' which pass diagonally across its base 44 on either side of the central circular opening 41, as illustrated in Fig. 16, and which fit between the projecting edges 32 and 32' of the longitudinal channels of the double channel plate. The main body 45 of the tilting block 37 is wedge-shaped as illustrated in Figs. 4, 14, 15 and 16. The wing nut 34 illustrated in Figs. 1 to 6, inclusive, serves to clamp the saw blade 38 to the tilting block 37 and spacing member or collar 46, or washer 47 is placed intermediate the wing nut 34 and the blade 38 depending on whether the blade is placed on the tilting block 37, for beveling the teeth 39, or is clamped directly to the top of the double channel plate 29 as in the case where a bevel is not required. The spacing member 46 which is used when the blade 38 is clamped to the tilting block 37 is circular in cross section and is provided with a lower portion 48 which is of smaller diameter to fit within the central opening 49 of the saw. The lower surface 50 of the spacing member or collar slopes in accordance with the slope of the tilting block 37 and the upper surface 51 is at right angles to the vertical axis.

The grinding disk 40 is attached to a shaft (not shown) of the driving motor 67 by means of a nut 66. The motor which drives the grinding disk is mounted upon a carriage 55 which comprises a plate 52 having set-in side strips 53 and 53' in which are mounted ball or roller bearings 54 in order to make the plate 52 readily slidable on the top plate 11 of the base or supporting frame 10. The plate 52 slides between track or guide members 56 and 56' which are formed of elongated strips 57 and flat cover strips 57'. The grinding motor may be moved so that the grinder either engages or disengages the teeth of the circular saw being ground. This movement is effected by means of the treadle 12, which is connected through the link 58 to the bell crank 59. The bell crank 59 is pivotally connected to bracket members 60 and 60' which connect to the top plate 11 of the frame or base 10. The bell crank which is composed of a right angularly formed strip is provided with circular openings 61 and 61' adjacent the ends of its lever members. The link 58 projects through the opening or hole 61 and is capped by a nut 62. A diagonally bent link 63 projects through the hole 61' and is capped by the nut 62'. The other end of this link is bent downward and projects through a hole 64 in the motor base 65. Thus, in order to move the grinding or sharpening disk 40 into engagement with the teeth 39 of the saw 38, it is only necessary to depress the foot treadle 12. From this action, the downward pull on the link 58 operates the bell-crank 59, which in turn by means of link 63, moves the motor 67 forward.

An adjustable stop member 68 is provided to prevent the grinding disk 40 from cutting the teeth of the saw too deeply. The stop member comprises a screw member 69 which engages the threads of a support member 70 which is mounted on the top plate 11 of the base 10. The screw is turned by means of a knurled disk 71. A helical spring 71' surrounds one end of the screw member 69 and is interposed between the motor base 65 and the support member 70. The spring tends to move the motor 67 rearward against the action of pressure on the foot treadle and thus disengage the grinding disk from the saw teeth when pressure on the foot treadle is released.

The armature shaft (not shown) of the grinding motor is adapted to drive a rotary saw at one end and a grinding wheel at the other. Both the saw and the grinder are protected by guards, each of which have cut-out sectors 72' and 73', respectively. In the saw guard 72 the cut-out portion is for the admission of the article to be cut and in the grinder guard 73 the cut-out portion 73' is for the admission on the toothed edge of the saw to be ground.

The stone or grinder guard 73 of the grinding disk 40 is provided with a slotted rest plate 74 which is formed of a slotted strip 75 having a curved end 76 and a slotted strip 77 which is bent at an angle of 90° to form the horizontally projecting portion 78 which is adapted to contact the saw. The slotted strip 75 is adjustably attached to the grinder guard 73 by means of the threaded stud 79, which is welded to the guard and the thumb screw 80, and the slotted strip 77 is adjustably connected to the strip 75 by means of the threaded stud 81 and the thumb screw 82. The slotted rest plate prevents the vibration of the teeth of the saw while in contact with the grinding disk or stone 40.

In the operation of the device, the left channel 31' of the double channel plate is used for grinding cross-cut and combination saws. Cross-cut saws have each tooth tapered away from its center to either side. The right channel 31 of the double channel plate is used for grinding rip saws. In rip saws, the teeth are ground squarely to the blade.

The two channels furnish the desired pitch of saw teeth in reference to the grinder. Rip saws require greater pitch and are moved farther off the axis of the grinder by means of the channel plate.

Having thus described our invention, what we claim as new and wish to secure by Letters Patent is:

1. A circular saw grinder comprising a base, a carriage slidably mounted upon said base, a motor mounted upon said carriage, a grinding disk driven by said motor, an arbor adjustably mounted upon said base, a double channel plate mounted upon said arbor, a tilting block mounted on the plate in one of the channels thereof for retaining a saw blade in grinding position, the said plate and tilting block being positioned on the base adjacent to the grinding disk, the said tilting block being adapted to be received in either channel of the plate for shifting a saw blade retained in the tilting block laterally of the grinding disk for predeterminately varying the angle between the saw blade and the grinding disk, the tilting block presenting the saw blade at an angle forming a cross-cut saw tooth in the blade when the tilting block is received in one of the said channels and at an angle defining a rip-saw tooth in the blade when the tilting block is received in the other of the said channels, manually operable means in connection with said motor and said base for moving said grinding disk into and out of engagement with said saw, and means mounted upon said base for limiting the engaging movement of said grinding disk.

2. A circular saw grinder comprising a base, a carriage slidably mounted upon said base, a motor mounted upon said carriage, a grinding disk driven by said motor, an adjustable arbor adjustably mounted upon said base, a double channel plate mounted upon said arbor, means mounted on the plate in one of the channels thereof for mounting a circular saw blade in grinding position relative to the grinding disk, the said plate and means being positioned on the base adjacent to the grinding disk, the said means being adapted to be received in either channel of the plate for shifting the saw blade laterally relatively to the grinding disk for predeterminately varying the angle between the saw blade and the grinding disk, the said means presenting the saw blade to the disk at an angle forming a cross-cut saw tooth in the blade responsively to the said means being in one of the channels and at another angle defining a rip-saw tooth in the blade responsively to the said means being in the other of the channels, manually operable means in connection with said motor and said base for slidingly moving said grinding disk into and out of engagement with said saw, and adjustable means mounted upon said base for limiting the engaging movement of said grinding disk.

3. A circular saw grinder comprising a base, a carriage slidably mounted upon said base, a motor mounted upon said carriage, a grinding disk driven by said motor, an arbor adjustably mounted upon said base, a double channel plate mounted upon said arbor, a tilting block mounted on the plate in one of the channels thereof for mounting a saw blade in grinding position, the said plate and tilting block being positioned on the base adjacent to the grinding disk, the said tilting block being adapted to be received in either channel of the plate for shifting a saw blade mounted on the tilting block laterally of the grinding disk for predeterminately varying the angle between the saw blade and the grinding disk, the tilting block presenting the saw blade at an angle forming a cross-cut saw tooth in the blade when the tilting block is received in one of the said channels and at an angle defining a rip-saw tooth in the blade when the tilting block is received in the other of the said channels, a square headed pin adjustably mounted within the double channel plate for retaining said tilting block in a fixed position within said double channel plate and for fastening a saw blade upon said tilting block, manually operable means in connection with said motor and said base for slidably moving said grinding disk into and out of engagement with said saw blade, and means mounted upon said base for limiting the engaging movement of said grinding disk.

4. A circular saw grinder comprising a base, a carriage slidably mounted upon said base, a motor mounted upon said carriage, a grinding disk driven by said motor, an arbor adjustably mounted upon said base, a double channel plate mounted upon said arbor, a tilting block mounted on the plate in one of the channels thereof for mounting a saw blade in grinding position, the said plate and tilting block being positioned on the base adjacent to the grinding disk, the said tilting block being adapted to be received in either channel of the plate for shifting the saw blade laterally of the grinding disk for predeterminately varying the angle between the saw blade and the grinding disk, the tilting block presenting a saw blade mounted on the tilting block at an angle forming a cross-cut saw tooth in the blade when the tilting block is received in one of the said channels and at an angle defining a rip-saw tooth in the blade when the tilting block is received in the other of the said channels, a square headed pin mounted in the said double channel plate, the tilting block being slotted clamping plates for retaining said pin and said tilting block in a fixed position within said double channel plate, and manually operable means in connection with said motor and said base for slidably moving said grinding disk into and out of engagement with said saw blade, and means mounted upon said base for limiting the engaging movement of said grinding disk.

CONSTANTINE RUSCITTI.
JOHN M. BARNES.

REFERENCES CITED

The following references are of record in the file of this patent:

UNITED STATES PATENTS

| Number | Name | Date |
|---|---|---|
| 89,724 | Abbott et al. | May 4, 1809 |
| 156,163 | Jewett et al. | Oct. 20, 1874 |
| 298,928 | Willey | May 20, 1884 |
| 338,787 | Rogers | Mar. 30, 1886 |
| 437,929 | King | Oct. 7, 1890 |
| 667,321 | Keyes | Feb. 5, 1901 |
| 908,304 | Miner | Dec. 29, 1908 |
| 1,050,464 | Huther | Jan. 14, 1913 |
| 1,401,696 | Hedstrom | Dec. 27, 1921 |
| 1,488,056 | Orr | Mar. 25, 1924 |
| 2,453,638 | Nietfeld | Nov. 9, 1948 |